Nov. 11, 1958 E. OLSON 2,859,700
WINDSHIELD WASHER PUMP
Filed June 7, 1954

INVENTOR.
Elmer Olson
BY
Craig V. Morton
HIS ATTORNEY

United States Patent Office 2,859,700
Patented Nov. 11, 1958

2,859,700

WINDSHIELD WASHER PUMP

Elmer Olson, Rochester, N. Y., assignor to General Motors Corporation, Detroit, Mich., a corporation of Delaware Application June 7, 1954, Serial No. 434,902

4 Claims. (Cl. 103—150)

This invention pertains to pumps, and particularly to apparatus for discharging a liquid solvent onto the windshield of a motor vehicle in timed relation with movement of the wipers thereacross.

Heretofore, windshield cleaning apparatus has included a motor for actuating the windshield wiper blades and a pump actuated independently of the wiper motor for discharging a liquid solvent onto a windshield. Moreover, since the two devices were independent, the controls therefor were also independent, and thus, coordination between the two devices was difficult to accomplish. In this invention the pump for supplying the liquid washing solvent is actuated by the wiper motor, and, hence, both the control and operation thereof is greatly simplified. Moreover, the liquid solvent will be discharged automatically onto the windshield in timed relation with movement of the wiper blades. Accordingly, among my objects are the provision of windshield cleaning apparatus including means for discharging liquid solvent onto a windshield in timed relation to movement of the wiper blades; the further provision of a windshield washer pump which is actuated by and in timed relation with operation of a wiper motor; and the still further provision of simplified control means for actuating a washer pump during, or concurrently with, operation of a wiper motor.

The aforementioned and other objects are accomplished in the present invention by attaching a pumping cylinder to one end of a motor cylinder and incorporating manually operable valve means for controlling the connection therebetween. Specifically, the washer pump of the present invention was designed for attachment to a windshield wiper motor of the type disclosed in copending application, Serial No. 409,332, filed February 10, 1954, now Patent No. 2,789,544, in the name of Lawrence C. Dermond. In this type of motor, the actuating medium is preferably hydraulic fluid under pressure, but it is readily apparent that the mechanism of this invention could be used with various other types of wiper motors which include a movable element and are actuated by either fluid under pressure, or a fluid pressure differential.

The wiper motor disclosed in the aforementioned application includes a cylinder having disposed therein a reciprocable piston capable of fluid pressure actuation in both directions, reciprocation of the piston being controlled by servo actuated reversing valve means which are carried by and movable relative to the piston. The wiper motor also includes means for extending the stroke of the piston at one end thereof so as to facilitate parking of the wiper blades against the cowl portion of a motor vehicle. When the controls for the motor are actuated so as to park the wiper blades, the piston is moved into abutting relation with one end wall of the cylinder and maintained in this position by the continued application of fluid under pressure to the other cylinder chamber.

The pumping accessory of this invention comprises a casing which is arranged to be attached to that end of the motor cylinder in which the piston is disposed when the wiper motor is in the parked position. To accomplish the objectives of this invention, one of the cylinder end caps is formed with an opening therethrough, the opening having communication with a valve guide within which a manually operable, reciprocable valve element is disposed. The valve element may be positioned through a Bowden wire connection, and when the valve is in the off position, it blocks the opening in the end cap.

The end cap is further modified to have a hollow cup-shaped portion which constitutes an actuating chamber for the pump. The pump also includes a casing having a cup-shaped recess therein, the casing being attached at its marginal edges to the end cap, and a resilient diaphragm, or fluid displacing member, disposed between the abutting surfaces of the pump casing and the end cap of the cylinder, divides the pump housing into a pumping chamber and an actuating chamber. The diaphragm is normally biased in one direction by a spring. The spring is disposed in the pumping chamber, and the pumping chamber has communication through a ball check valve with a conduit connected to a reservoir of liquid solvent, as well as through a second ball check valve to a conduit connected with the nozzles which are located in proximity to the cowl of a motor vehicle.

When the valve element blocks communication between the motor cylinder and the pump actuating chamber, reciprocation of the motor piston within the motor cylinder will be accomplished independent of actuation of the pump. However, when the valve is moved so as to connect one of the motor cylinder chambers with the pump actuating chamber, during movement of the piston in one direction due to the application of pressure fluid, the diaphragm will be moved so as to discharge liquid solvent from the pumping chamber. Conversely, during movement of the motor piston in the opposite direction, the spring will return the diaphragm to its original position, thereby filling the pumping chamber with liquid solvent from the reservoir. Accordingly, it will be appreciated that liquid solvent will be discharged onto the windshield in timed relation to movement of the motor piston, and, hence, in timed relation to movement of the wiper blades. In particular, the liquid solvent will be discharged onto the windshield during movement of the wiper blades from the cowl to their outermost position. Moreover, the controls will be greatly simplified inasmuch as to effect concurrent wiper movement and the discharge of liquid solvent onto the windshield, it is only necessary to open the motor control valve and the pump control valve simultaneously.

Further objects and advantages of the present invention will be apparent from the following description, reference being had to the accompanying drawing wherein a preferred embodiment of the present invention is clearly shown.

Figure 1:
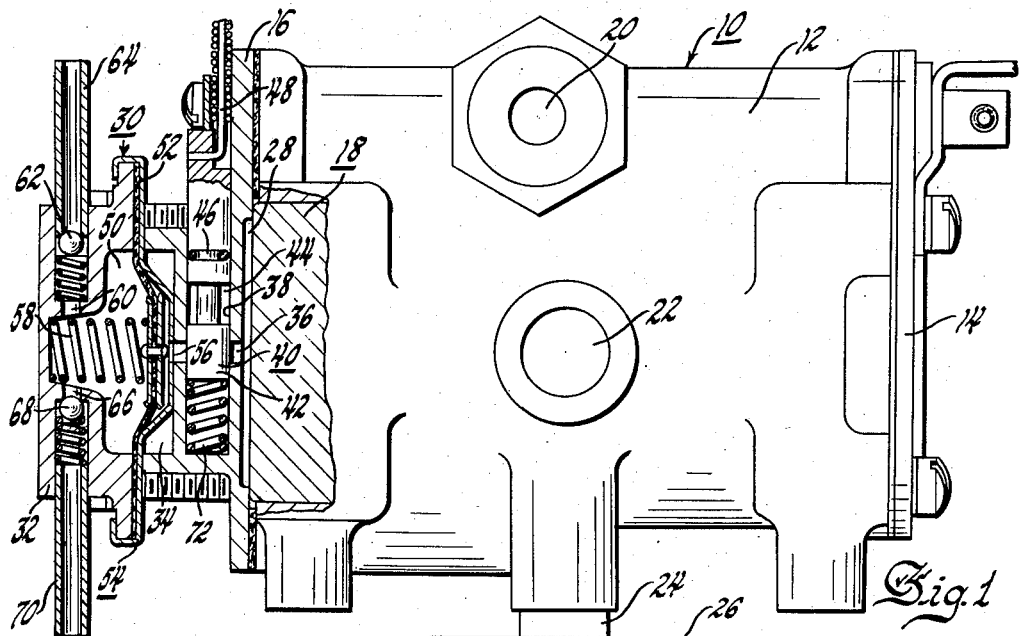
Fig. 1 is a view, partly in elevation and partly in section, of a combination motor-pump assembly constructed according to this invention.

With particular reference to Fig. 1 of the drawing, the washing apparatus of this invention is shown in combination with a wiper motor 10 having a cylinder 12, the open ends of which are closed by end caps 14 and 16, respectively. In accordance with the aforementioned copending application, Serial No. 409,332, now Patent No. 2,789,544, the motor includes a double-acting reciprocable piston 18, which is capable of fluid pressure actuation in both directions, continuous reciprocation of the motor being effected by servo actuated reversing valve means, which are carried by and movable relative to the piston. Operation of the wiper motor is controlled by a manually operable valve, not shown. The cylinder also includes an inlet port 20 for hydraulic medium under pressure, as well as an outlet port 22. The piston is operatively connected to a rotatable output shaft 24 through a pin and trunnion assembly, as described in the aforementioned application. Thus, during reciprocation of the piston 18, oscillatory movement will be imparted to the shaft 24 which, as shown, is connected to an output member 26 adapted for connection to any suitable transmission, not shown, for transmitting oscillatory movement to wiper blades, not shown.

Figures 2, 3:
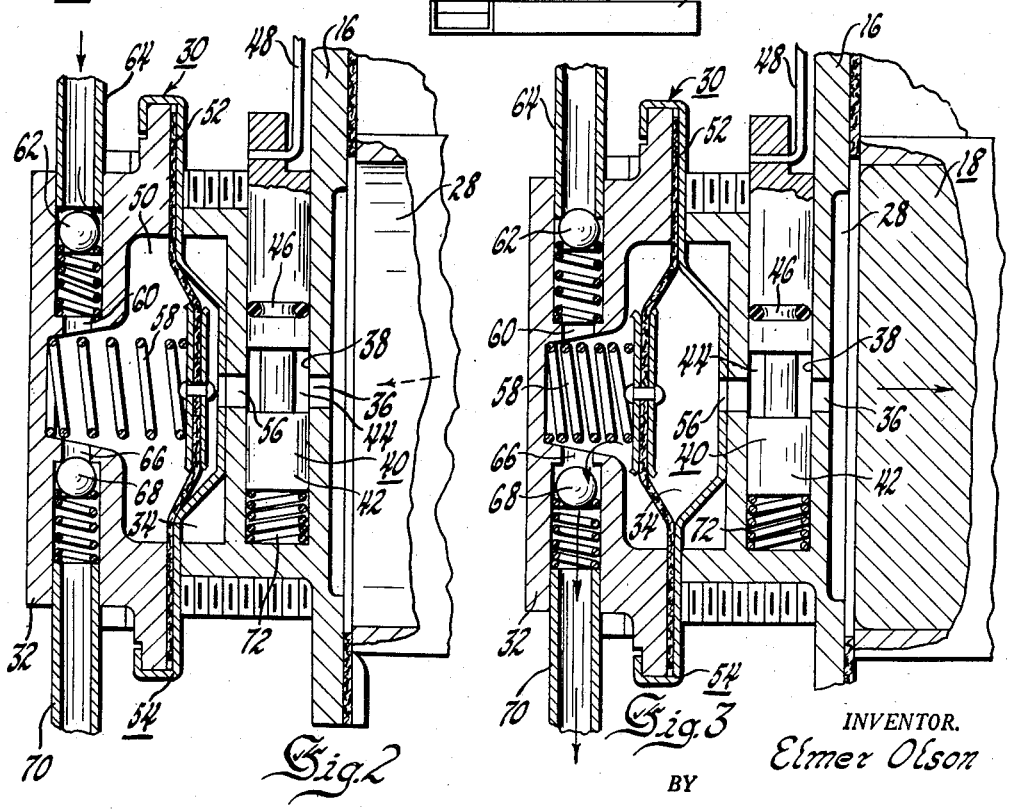
Fig. 2 is a fragmentary view similar to Fig. 1 depicting the intake stroke of the pump.
Fig. 3 is a view similar to Fig. 2 depicting the discharge stroke of the pump.

The motor piston 18 is movable between predetermined limit positions during operation thereof. Moreover, when operation of the motor is interrupted by the manually operable control valve, not shown, the piston 18 will be moved to a parked position against the end cap 16, as shown in Fig. 1, which movement increases the amplitude of oscillation imparted to the driven shaft 24 so as to move the blades against the cowl of a motor vehicle. The normal limit position of the piston 18 during wiping operation is depicted in Fig. 3.

The present invention contemplates provision of a pump, designated generally by the numeral 30, which is attached to the end cap 16, the pump including a movable fluid displacing member having a delivery stroke and actuated in timed relation with the wiper motor by the same fluid pressure medium. In a conventional manner, the pump 30 will draw liquid solvent from a reservoir, not shown, and discharge the same through a nozzle, not shown, which is disposed to direct the liquid solvent onto the windshield of a motor vehicle.

The pump 30 is constituted in part by the end cap 16 and by a casing 32, which, together with the end cap 16, forms a pump housing. Thus, the end cap 16 is formed with a cup-shaped recess 34 and a centrally disposed opening 36, which communicates with cylinder chamber 28. The end cap 16 is also formed with a transversely extending valve guide 38, which intersects the opening 36, and has disposed therein a reciprocable valve element 40 having a land 42 adapted in one position to block communication between the recess, or actuating pump chamber, 34 and the cylinder chamber 28. The valve element 40 also includes an annular groove 44, which is designed to facilitate communication between actuating chamber 34 and cylinder chamber 28 through the opening 36, as shown in Figs. 2 and 3. In addition, the valve element 40 carries a rubber O-ring 46, which constitutes a seal preventing leakage of fluid medium from the actuating chamber 34 and the cylinder chamber 28.

The valve element 40 is operatively connected to one end of a Bowden wire 48, which may be connected with a wiper control knob, not shown, on the dashboard of a vehicle. More particularly, a Bowden wire may be connected with the knob so that by pulling the knob outward, the valve element 40 will be moved from the position of Fig. 2 to the position of Fig. 1, and by pushing the knob inward, the valve element will be moved in the opposite direction. This same control knob, not shown, may also be used to actuate the control valve for the windshield wiper motor, as set forth in the aforementioned copending application, and the arrangement may be such that rotary movement of the knob will position the wiper motor control valve. Thus, it is apparent that the controls for operating the washer and wiper motor will be greatly simplified, and the washer and wiper may be operated from the same control knob with separate and independent movements thereof.

The casing 32 also includes a generally cup-shaped recess 50, which constitutes the pumping chamber. The actuating chamber 34, and the pumping chamber 50 are separated by a flexible diaphragm 52, the marginal portion of which is clamped between the end cap 16 and the casing 32. In a conventional manner the diaphragm 30 includes a metallic backing member 54 having a central opening 56 disposed in alignment with the opening 36 in the end cap 16. The flexible diaphragm 54 is normally biased to the position shown in Fig. 1 by means of a coiled compression spring 58, opposite ends of which seat on the diaphragm and the internal surface of the casing 32, respectively.

The pumping chamber 50 is connected by a passage 60 through a one-way spring biased ball check valve 62 to a conduit 64, which is connected to any suitable supply, or reservoir, of liquid solvent, not shown. The pumping chamber 50 is also connected through a passage 66 through a second one-way spring biased ball check valve 68 to a conduit 70, which is connected with the discharge nozzles, not shown. In addition, the control valve 28 is spring biased to the closed position by means of a compression spring 72.

Operation

Operation of the cleaning apparatus of this invention is as follows. When the wiper motor is in operation, and, thus, the piston 18 is being maintained in a state of continuous reciprocation, the Bowden wire 48 may be actuated so as to move the valve element 40 from the position of Fig. 1 to the position of Figs. 2 and 3. During movement of the motor piston 18 to the left, as viewed in the drawing, the cylinder chamber 28 is connected to drain. Accordingly, the actuating chamber 34 of the pump will also be connected to drain and the spring 58 will effect movement of the diaphragm 54 to the position of Fig. 2. This movement of the diaphragm constitutes the intake stroke of the pump during which liquid solvent is drawn from the reservoir, not shown, through the conduit 64, the check valve 62 and into the pumping chamber 50. Upon reversal of piston movement, which is caused by the application of fluid pressure to cylinder chamber 28, as shown in Fig. 3, fluid pressure will also be applied to the pumping chamber 34 so as to effect movement of the diaphragm 54 from the position of Fig. 2 to the position of Fig. 3. It will be understood that this movement does not take place instantaneously due to the opposition of spring 58. Thus, the spring 58 is chosen so that the diaphragm 54 will not move completely to the left, as shown in Fig. 3, until the motor piston 18 and, hence, the wiper blades, not shown, have moved throughout their complete stroke in one direction. Thus, liquid solvent will be discharged onto the windshield in timed relation with movement of the wiper blades substantially continuously throughout the stroke from the cowl outwardly. During the discharge, or delivery stroke, of the pump, it will be appreciated that the liquid solvent in the pumping chamber 50 will be discharged through ball check valve 68 and conduit 70 to the washer nozzles, not shown.

It should further be noted that the pump 30 is attached to the end cap 16 by reason of the fact that the piston 18 parks adjacent the end cap 16. Thus, when the piston 18 is in the parked position, fluid under pressure is being continuously supplied through the opposite chamber of the motor while chamber 28 is connected to drain. In this manner, loss of fluid from the motor due to leakage about the valve element 40 is obviated. Thus, if the pump 30 were attached to the end cap 14, the valve guide 38 would be subjected to fluid pressure most of the time, since pressure is continuously applied to the motor chamber opposite chamber 28 when the motor is inactive.

From the foregoing, it is readily apparent that the present invention provides an exceedingly simple windshield apparatus wherein the washer pump is actuated by the motor in timed relation therewith, and wherein the control mechanism for the pump and motor is exceedingly simple to operate. Thus, the washer pump may be activated at any time when the windshield motor is in operation, or the washer pump and the motor may be activated substantially simultaneously.

While the embodiment of the present invention as herein disclosed, constitutes a preferred form, it is to be understood that other forms might be adopted.

What is claimed is as follows:

1. Windshield cleaning apparatus comprising in combination, a wiper motor having a cylinder with a reciprocable piston disposed therein capable of fluid pressure actuation in both directions and dividing it into two chambers, a pump having a liquid displacing member with an intake stroke and a delivery stroke, a spring biasing said liquid displacing member to move it throughout one stroke, and passage means interconnecting one chamber of said motor cylinder and said pump whereby the application of fluid pressure to said one chamber of the motor for effecting movement of said piston in one direction will concurrently effect movement of said fluid displacing member in its other stroke, and when said one chamber is connected to drain during movement of said piston in the other direction said spring is rendered operative to effect said one stroke.

2. The combination set forth in claim 1 wherein said cleaning apparatus includes a valve disposed in the passage means between said motor cylinder and said pump for controlling communication therebetween.

3. Windshield cleaning apparatus comprising in combination, a windshield wiper motor having a cylinder with a reciprocable piston disposed therein and dividing said cylinder into two chambers connected alternately to fluid pressure and drain so as to effect movement of said piston in opposite directions, a pump having a liquid displacing diaphragm with an intake stroke and a delivery stroke, resilient means acting constantly upon said diaphragm for effecting one stroke thereof, said diaphragm dividing said pump into an actuating chamber and a pumping chamber, passage means connecting said actuating chamber with one chamber of said motor cylinder whereby the connection of said one motor chamber to fluid pressure for actuating said piston in one direction may be utilized to effect the other stroke of said diaphragm and during movement of said piston in the other direction by the connection of said one motor chamber to drain and the other motor chamber to pressure said resilient means will be rendered effective to cause said one stroke of said diaphragm, and a manually operable valve disposed in said passage means for selectively rendering said pump operative or inoperative.

4. Windshield cleaning apparatus including in combination, a windshield wiper motor having a cylinder with a reciprocable piston disposed therein and dividing said cylinder into two chambers connected alternately to fluid pressure and drain so as to effect movement of said piston in opposite directions, a pump having a casing attached to said cylinder and a liquid displacing member disposed within said casing having an intake stroke and a delivery stroke, resilient means acting constantly on said liquid displacing member for effecting one stroke thereof, said liquid displacing member dividing said casing into an actuating chamber and a pumping chamber, passage means connecting said actuating chamber with one chamber of said motor cylinder whereby connection of said one motor chamber to fluid pressure for actuating said piston in one direction may be utilized to effect the other stroke of said liquid displacing member and during movement of said piston in the other direction by the connection of said one motor chamber to drain and the other motor chamber to pressure, said resilient means will be rendered operative to effect said one stroke of said liquid displacing member, and valve means disposed in said passage means and operable to render said pump operative or inoperative.

References Cited in the file of this patent
UNITED STATES PATENTS

| | | |
|---|---|---|
| 1,991,235 | True | Feb. 12, 1935 |
| 2,214,922 | Ericson | Sept. 17, 1940 |
| 2,376,009 | Sacchini | May 15, 1945 |
| 2,585,172 | Reynolds | Feb. 12, 1952 |
| 2,649,332 | Rappl | Aug. 18, 1953 |